(12) United States Patent
Hardy et al.

(10) Patent No.: US 8,737,411 B2
(45) Date of Patent: May 27, 2014

(54) DELIVERY DELAY COMPENSATION ON SYNCHRONISED COMMUNICATION DEVICES IN A PACKET SWITCHING NETWORK

(75) Inventors: Patrick Hardy, Baulon (FR); Bruno Derrien, Domloup (FR); Bertrand Provost, Saint Gregoire (FR); Olivier Marlec, La Chapelle des Fougeretz (FR); Hubert Prioul, Guignen (FR)

(73) Assignee: GVBB Holdings S.A.R.L., Luxembourg (LU)

( * ) Notice: Subject to any disclaimer, the term of this patent is extended or adjusted under 35 U.S.C. 154(b) by 189 days.

(21) Appl. No.: 12/736,565

(22) PCT Filed: Apr. 23, 2009

(86) PCT No.: PCT/EP2009/054922

§ 371 (c)(1),
(2), (4) Date: Oct. 20, 2010

(87) PCT Pub. No.: WO2009/133019

PCT Pub. Date: Nov. 5, 2009

(65) Prior Publication Data

US 2011/0032946 A1    Feb. 10, 2011

(30) Foreign Application Priority Data

Apr. 30, 2008    (EP) .................................... 08300197

(51) Int. Cl.
*H04L 12/56*    (2006.01)
(52) U.S. Cl.
USPC ....... 370/401; 370/389; 375/240.28; 348/497
(58) Field of Classification Search
USPC .............................. 370/389, 401; 375/240.28; 348/497–544
See application file for complete search history.

(56) References Cited

U.S. PATENT DOCUMENTS

| | | | |
|---|---|---|---|
| 4,059,040 A * | 11/1977 | Obayashi et al. | 84/648 |
| 7,822,157 B2 * | 10/2010 | Keller et al. | 375/354 |
| 8,073,060 B2 * | 12/2011 | Compton et al. | 375/240.28 |

(Continued)

FOREIGN PATENT DOCUMENTS

| | | |
|---|---|---|
| JP | 2001-251360 A | 9/2001 |
| JP | 2003-037585 A | 2/2003 |
| WO | WO2007104891 | 9/2007 |

OTHER PUBLICATIONS

Gramann et al., "Precision Time Protocol IEEE 1588 In Der Praxis Zeitsynchronisation Im Submikrosekundenbereich", Elektronik, Weka Fachzeitschriftenverlag, Poing, DE, vol. 52, No. 24, Nov. 25, 2003, pp. 86-91,93/94.

(Continued)

*Primary Examiner* — Dang Ton
*Assistant Examiner* — Mewale Ambaye
(74) *Attorney, Agent, or Firm* — Arent Fox LLP

(57) ABSTRACT

The present invention relates to the synchronizing of equipment, and more precisely to the transporting of synchronization signals via a communication network with a view to inter-synchronizing the equipment. The invention concerns a reference station able to deliver packets in a packet switching network to communication devices connected to the network. According to the invention, the reference station comprises means for inserting at least a temporal offset in said packets, wherein said temporal offset describes data delivery duration on a pre-determined path of said network. The invention relates also to a sending communication device and to a receiving communication device.

21 Claims, 2 Drawing Sheets

(56) References Cited

U.S. PATENT DOCUMENTS

| | | | | |
|---|---|---|---|---|
| 2002/0173322 | A1* | 11/2002 | Turetzky et al. | 455/502 |
| 2004/0125868 | A1* | 7/2004 | Keller et al. | 375/150 |
| 2004/0257369 | A1* | 12/2004 | Fang | 345/501 |
| 2007/0216691 | A1 | 9/2007 | Dobrin | |
| 2007/0283228 | A1* | 12/2007 | Kikuchi et al. | 714/776 |
| 2009/0175271 | A1* | 7/2009 | Tapie et al. | 370/389 |

OTHER PUBLICATIONS

Search Report Dated January 14, 2010.

Notice of Reasons for Rejection in Japanese Patent Application No. 2011-506660 dated Jul. 2, 2013.

International Preliminary Report on Patentability for International Application No. PCT/EP2009/054922, dated Nov. 2, 2010 (Feb. 11, 2010).

* cited by examiner

US 8,737,411 B2

DELIVERY DELAY COMPENSATION ON SYNCHRONISED COMMUNICATION DEVICES IN A PACKET SWITCHING NETWORK

This application claims the benefit, under 35 U.S.C. §365 of International Application PCT/EP2009/054922, filed Apr. 23, 2009, which was published in accordance with PCT Article 21(2) on Nov. 5, 2009 in English and which claims the benefit of European patent application No. 08300197.4, filed Apr. 30, 2008.

FIELD OF THE INVENTION

The invention relates to the synchronizing of equipment, and more precisely to the transport of synchronization signals via a communication network with a view to inter-synchronizing the equipment and delivery delay compensation on communication devices connected to a packet switched network.

BACKGROUND OF THE INVENTION

Certain equipment, such as for example video equipment (for example cameras or video recorders), is able, once synchronized with respect to a reference time base, of providing synchronized data (defining for example video images). This synchronization is done by transmitting to the equipment a synchronization signal, which is for example called "Genlock" in the (non-limiting) case of video equipment.

When the transmission of the synchronization signal is done by means of a dedicated cable, for example of coaxial type, no other signal flows in this cable. Consequently, the lag in transmitting the synchronization signal up to the various items of equipment to be synchronized is constant and devoid of jitter. On the basis of the synchronization signal received, each receiver item of equipment is able to reconstruct a timing clock (or reference time base or else reference clock signal) specific to its operation and guaranteeing that each data set (such as an image) that it generates is strictly in phase with each data set generated by each other item of equipment which is the subject of the same synchronization. Thus, two cameras can for example generate video contents which differ but are strictly in phase and in frequency with respect to one another. It is recalled that the phase and frequency of a clock constitute what is called its timing.

When the equipment is connected to a communication network introducing transmission lags and jitters that vary from one item of equipment to another, as is the case in particular for a so-called packet switching network, such as a wire-based (Ethernet) or non-wire-based IP network, it is no longer possible to transmit the synchronization signal. A sampled ramp signal which is representative of the synchronization signal is then transmitted on the network part.

More precisely, on the send side, information making it possible to recover a reference clock signal and content ticks (for example image ticks) is extracted from the synchronization signal (for example Genlock), which is delivered by a master item of equipment. The reference clock signal supplies first and second counters delivering first and second synchronous ramp signals representative of the number of ticks of the reference clock signal that have been delivered respectively since the last recovered content tick and since a last reference tick. The value of the first counter is set to zero each time that a content tick is recovered. A third counter meters the number of zero settings of the first ramp signal and generates a reference tick each time that this number is equal to a chosen threshold. The value of the second counter (generally termed "PCR" (for "Program Clock Reference")) is set to zero each time that a reference tick is generated. The second ramp signal is sampled according to a sampling frequency (which is generally provided by the network) and the resulting samples are transmitted via the network to the receiver items of equipment by means of frames of packet(s).

It will be noted that in the case of video contents, the period of the content ticks is for example equal to 40 ms in the case of a 625 lines standard.

On the receive side, the samples received via the network are used to synchronize a phase-locked loop (or PLL) and therefore to reconstruct the starting reference clock signal. More precisely, the phase-locked loop reconstructs the reference clock signal on the basis of the second sampled ramp signal transmitted, then it reconstructs a second ramp signal identical to, and in phase with, that having been sampled send side. Processing means are charged with initializing the value of a synchronization counter, synchronous with respect to the second reconstructed ramp signal, on the basis of the latter and of the reconstructed reference clock signal.

The second ramp signals (PCR), sampled send side at regular intervals (sampling period) arrive at irregular intervals on receive side, predominantly because of the jitter which is introduced by transporting them (for example over IP). These PCR signals are again taken into account at regular intervals ($T_{samp}$) on the receive side. The phase-locked loop (PLL) is charged with filtering the jitter related to the sampling instant of the PCR counting ramp by the sampling signal of period $T_{samp}$, so that a second ramp signal which evolves strictly in a manner synchronous with the second ramp signal (PCR) generated send side is retrieved as output from the counter (receive side). The inaccuracy between the sampling instants on send side and on receive side is absorbed by the PLL whose bandwidth is appropriate. Therefore the timing of the reference clock signal reconstructed receive side is identical to that generated on send side, both in frequency and in phase.

Once the timing has been reconstructed, it is necessary to reconstruct the first ramp signal and synchronize it with respect to the second reconstructed ramp signal. Accordingly, the same zero-setting period is used as that used on the send side (for example 40 ms). Then, each time the first ramp signal is set to zero a content tick is generated, and the initial synchronization signal is reconstructed on the basis of the content ticks and the reference clock signals reconstructed.

This synchronization mechanism is disclosed in international application PCT FR2007/050918.

By doing this way, equipments driven by such a reference station produce synchronously data streams. But the system described above doesn't cope with the data delivery duration after the stream production which can be a problem. This problem appears for example when a sound and a video signals are both simultaneously acquired by a microphone and a camera synchronized as described above. Both, video and audio streams are acquired and delivered synchronously. When such streams are sent to a TV set, if delivery duration of the video stream between the camera and the TV set isn't exactly the same than the delivery duration between the microphone and the TV set, an audio lip sync effect appears on the TV set caused by the delay between the two streams. The reconstruction of synchronization signals on camera and on microphone is not a guarantee that both streams are perfectly in phase at TV set level.

Another illustration of the problem is encountered when two video streams delivered by two synchronized cameras are sent to a video mixer. Due to a difference of delivery duration, for example caused by a difference of transport and/or processing duration on two different data paths, one cannot make a clean transition between two video streams.

One of the goals of the present invention is to remedy the concerns connected with the delays due to various data delivery duration, when data streams are produced between various synthesized synchronization signals in the prior art, by providing a mechanism that compensate these delays.

SUMMARY OF THE INVENTION

The technical problem that present invention intends to solve is to transmit over the network information which can be used to reconstruct synchronization signals in phase on all receive sides.

Thus, the present invention concerns, according to a first aspect, a reference station able to deliver packets in a packet switching network to communication devices connected to the network, said reference station comprising:
  means for retrieving image ticks from a sync signal;
  means for initializing an image counter from those image ticks;
  means for initializing a counter CPT_PCR at each $m^{th}$ reset of the image counter, the counter CPT_PCR being cadenced by a clock produced by the image counter;
  means for sampling the counter CPT_PCR at each $T_{ech}$ period, $T_{ech}$ being issued by a time base synchronized on all stations of the network, and
  means for delivering packets comprising samples $PCR_e$ of the counter CPT_PCR,
To this end, the reference station further comprises means for inserting at least a temporal offset in said packets, wherein said temporal offset describes data delivery duration on a pre-determined path of said network.

The present invention concerns, according to a second aspect, a receiving communication device connected to a packet switched network, said receiving device being able to receive packets from a reference station connected to the network, said receiving device being able to receive data stream from emitting communication devices being connected to the network, said receiving communication device comprising:
  means for receiving packets comprising samples $PCR_r$, said samples $PCR_r$ resulting from a sampling operation realized at a $T_{ech}$ period, $T_{ech}$ being issued by a time base synchronized on all stations of the network;
  means for generating a counter ramp CSR_PCR with a Phase Locked Loop $PLL_1$ receiving the samples and delivering a synthesized clock $CLK\_out_1$ and local samples $PCR\_loc_1$ at each $T_{ech}$ period;
  means for initializing an image counter CPT cadenced by the synthesized clock $CLK\_out_1$ each time the counter ramp $CSR\_PCR_1$ is equal to zero;
  means for generating image ticks each time the image counter CPT is equal to zero;
  means for generating a sync signal from the said image ticks;
To this end, the receiving communication device comprises:
  means for receiving at least a temporal offset value inserted in said packets;
  means for receiving data stream from sending communication device;
  means for determining from received data stream which temporal offset it has to consider among received temporal offsets;
  means for shifting temporally the received data stream with considered temporal offset.

The present invention concerns, according to a third aspect, a sending communication device connected to a packet switched network, said sending device being able to receive packets from a reference station connected to the network, said sending device being able to send data stream over the network, said sending device comprising:
  means for receiving packets comprising samples $PCR_r$, said samples $PCR_r$ resulting from a sampling operation realized at a $T_{ech}$ period, $T_{ech}$ being issued by a time base synchronized on all stations of the network;
  means for generating a counter ramp CSR_PCR with a Phase Locked Loop $PLL_1$ receiving the samples and delivering a synthesized clock $CLK\_out_1$ and local samples $PCR\_loc_1$ at each $T_{ech}$ period;
  means for initializing an image counter CPT cadenced by the synthesized clock $CLK\_out_1$ each time the counter ramp $CSR\_PCR_1$ is equal to zero;
  means for generating image ticks each time the image counter CPT is equal to zero;
  means for generating a sync signal from the said image ticks;
To this end, the sending communication device comprises:
  means for sending data stream over the network synchronously to sync signal;
  means for inserting an identification of said sending communication device in said data stream.

The present invention concerns, according to a fourth aspect, a synchronization transport container for transferring a sample of a counter ramp realized at a frequency $1/T_{ech}$ between two communication devices connected over a packet switched network, $T_{ech}$ being issued by a time base synchronized on all communication devices.

To this end, the synchronization transport container further comprises at least a temporal offset which describes data delivery duration on a pre-determined path of said network.

Advantageously, the receiving communication device further comprises means for shifting temporally the generated sync signal with considered temporal offset.

A first advantage of the invention relates to the ability it gives to insure a simultaneous phase control of streams sent by multiple sending communication devices to a receiving device similar to those disclosed in international application PCT FR2007/050918. In particular, the PCR ramp which is used in current invention is unchanged in regard with the ramp signals described in this previous application.

A second advantage of the invention relies on the versatility of the protocol used to recover the reference signal. It can be implemented with little adaptation on other types of network infrastructure as it is, and could also be adapted in an industrial automotive system or even in a WAN environment.

A third advantage of the invention is that it is an easy solution to handle compensation of flows delay caused by multiple data paths. Due to their length these delays can not be compensated only by a system of reducing the network delay and jitter effects belonging to the state in the art.

A fourth advantage of the invention is that it is a faithful solution. Here, "faithful" highlights the fact that the temporal offset values which are regularly distributed could be modified in time to take into account changes in the production environment (addition or removal of new communication devices).

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way imitative, with reference to the appended figures on which.

DETAILED DESCRIPTION OF PREFERRED EMBODIMENTS

Figure 1:
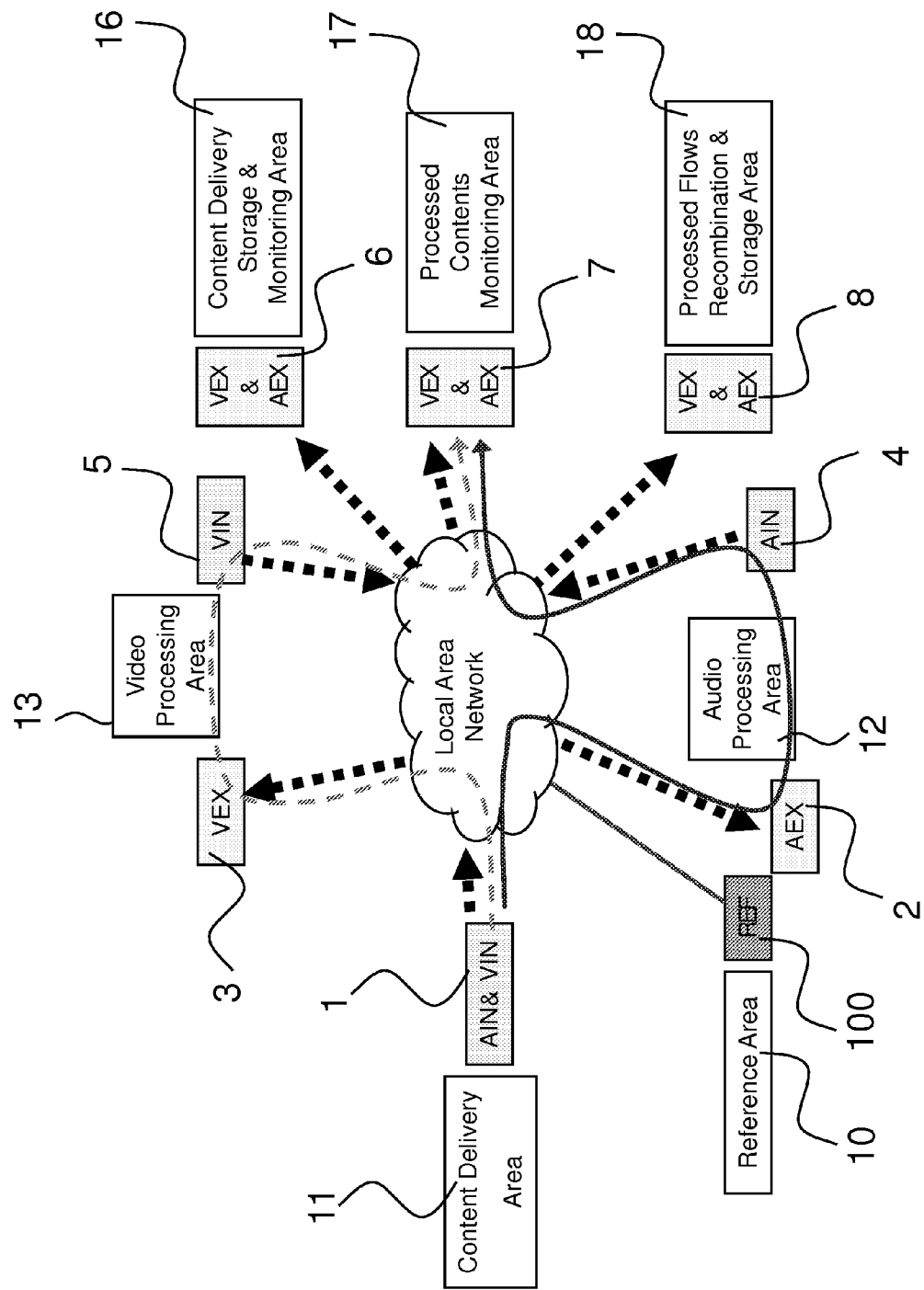
FIG. 1 represents a high-level view of a video production environment according to the invention.

FIG. 1 describes a video production environment where different blocks may be listed depending on their role in a flows management:
 Content Delivery Area, 11;
 Audio Processing Area, 12;
 Video Processing Area, 13;
 Content Delivery Area & Monitoring Area, 16;
 Processed Contents Monitoring Area, 17;
 Processed Flows Recombination & Storage Area, 18;

All these blocks have network interfaces such as: Video Ethernet Inserter VIN, 1, 5; Audio Ethernet Inserter AIN, 1, 4; Video Ethernet Extractor VEX, 2, 6, 7, 8; Audio Ethernet Extractor, AEX 2, 6, 7, 8. Links between interfaces and network are depicted by arrows in large dotted lines in FIG. 1. The direction of arrow indicates the direction followed by the flows between blocks.

Content Delivery Area gathers equipments which deliver contents in the studio. These equipments belong to various types: camera, microphones, DMOD, VTRs, etc. . . . . They can be located everywhere in a video production studio or even part of equipment used for complementary functions as storage e.g. servers are located in the Content Delivery Area for the signal feeding part and in the Content Delivery Storage & Monitoring Area and Processed Flows Recombination & Storage Area for the signal recording part.

Audio Processing Area gathers all the equipments related to audio processing, and Video Processing Area gathers all the equipments related to video processing.

The block Reference Area, 10 supplies means to synchronize all the equipments belonging to various blocks according the operation mode described above.

Based on the destination of the incoming data flows, the different blocks may run with a different synchronization signal in order to optimize data delivery delay to their outputs. For an operation point of view, it is difficult to display simultaneously information coming from Content Delivery Area and Video Processing Area because an operator needs to visualize incoming streams before applying a processing on.

At the level of Processed Flows Recombination & Storage Area, it is mandatory to provide a relevant and efficient solution to manage the data flow association without issues, for example to avoid audio lip sync effect as explained above.

Interfaces of blocks can be identified by a unique index later called "Genlock Plane". FIG. 1 shows eight Genlock planes: Genlock Plane 1 identifies outputs of Content Delivery Area, Genlock Planes 2 and 4 mark the boundary of the Audio Processing area, Genlock Planes 3 and 5 mark the boundary of the Video processing area; Genlock Plane 6 corresponds to the input of the Content Delivery Storage and Content Delivery Monitoring Area; Genlock Plane 7 and 8 corresponds to the input of the processed Content Monitoring Area, Processed Flows Recombination and storage area.

The Genlock plane defines a timing of the start of frame of an analogical Genlock signal which is considered as a reference signal for equipments external to the Network. By construction, all the streams sent by a Genlock Plane are synchronized.

The FIG. 1 reports two different paths of the delivered flows on the video production environment. A first flow (audio stream) (represented in plain line) starts from interface 1, crosses blocks 2, 12 and 4 and reaches interface 7 via the network. A second flow (for example a video HD stream) (represented in dashed line) starts from interface 1 and crosses blocks 3, 13 and 5 before reaching block 7 still via the network.

Considering that both flows are sent synchronously because they are sent by a same Genlock Plane, they won't exactly arrive at the same date on interface 7 due to the difference between blocks they cross. Considering for example that:
 the network brings a delay of 1 milli-second (ms) to the flows delivery,
 the audio interfaces 2 and 4 did not bring any delay to the flows delivery;
 the block 12 (internal audio processing) brings a delay of 50 ms to the flows delivery;
 the interfaces 3 and 5 (internal video processing) bring a delay of 50 ms to the flows delivery;
 the block 13 (video processing) brings a delay of 50 ms to the flows delivery.

If both flows are sent at date 0, the second flow will arrive at interface 7 at a date 1+50+50+50+1=152 ms. That means the second flow will arrive later than the first flow and more precisely with a delay of 100 ms. This delay is due to the topology and the configuration of the network: it is perfectly predictable, and then it can be compensated.

A solution to realize easily and faithfully the delivery delay compensation consists in transmitting regularly values of temporal offsets (or delay values) brought to data sent by different Genlock Planes, and in parallel to associate the emission of data with an identification of the Genlock Plane from which the data is sent.

By receiving these two pieces of information, a receiving communication device can determine which temporal offset it has to consider among the received temporal offsets and then shift temporally the received data stream in order to temporally align them.

The feature "easy" of the solution is linked with the chosen way to transmit the temporal offsets: one knows emitting/receiving devices which are able to synchronize themselves by using a 1588 layer and transmitting samples of a predefined ramp signal in synchronization messages. The chosen solution deals with transmitting temporal offset inside synchronization messages (delivered packet) which contain these samples as reminded above.

The feature "faithful" of the solution is linked with its adaptability to the "topology" of the network. A modification of the video environment is taken into account by a modification of the temporal offset values which are sent.

Advantageously, every delivered packet contain temporal offset.

Then, when $T_{ech}$ is equal to one second, a modification can be taken into account in less than one second.

Figure 2:
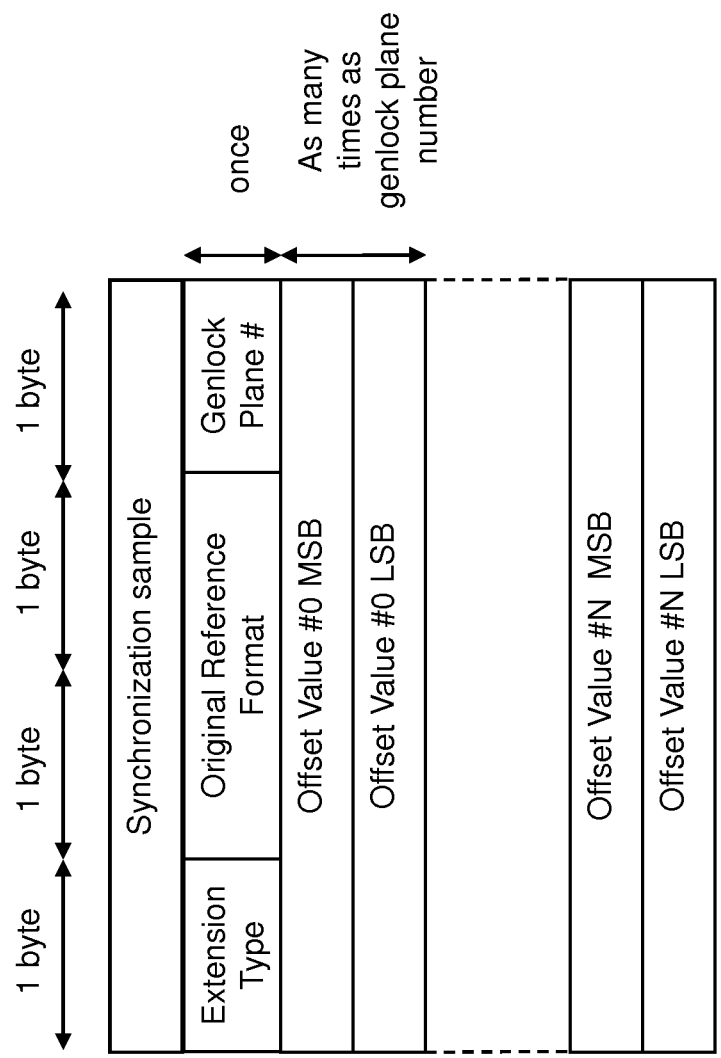
FIG. 2 shows an example of synchronization transport container structure according to the invention.

FIG. 2 shows an implementation of synchronization message delivered over the network by reference station according to the invention. This message shall be processed by all the communication devices which transport or deliver signals coming to or from IP streams.

In the implementation according to the invention, the synchronization message contains a first field corresponding to the value of ramp PCR counter at the instant $T_{ech}$.

A second field, called "Extension Type", is also used to indicate what data contains the extension and how it is organized. This field exists only once in the extension. Extension type is a 1 byte field.

Advantageously, the temporal offset is expressed as a number of periods of a clock common to reference station and to all communication devices connected to the network.

A third field, called "Reference Format", is also used to describe the signal delivered by the reference station. This field is for example divided in 2 bytes: one concerning video reference, another concerning audio reference. It allows generating at the reception side a reference signal which has same format than the reference signal received at sending side. For video reference, the following information must be reported: an information on frame rate of the reference signal (50 Hz, 60 Hz, 25 Hz, etc. . . . ), an information on format of the reference signal (for example PAL-BGHI, PAL M, PAL N, NTSC-M, TLS, etc. . . . ), an information on type of signal (SD, HD); and an information on description of the signal for example (1920*1080 I, 1920*1080 P, etc. . . . .)

A fourth field, called "Genlock plane #" is also used to indicate a number of temporal offsets which is enumerated in the current synchronization message. "Genlock plane #" is a 1 byte field. 256 is the maximum number of temporal offset (or "Genlock planes") which can be described in a synchronization message.

At least, if n is a value which is in "Genlock plane #" field, there are n fields called "offset value". These "offset value" fields indicate the temporal offset values expressed in a number of reference clock periods (8 bytes field decomposed in two 4 bytes words). These temporal offset values have to be applied to generate the reference signal associated to the above Genlock plane #.

The invention claimed is:

1. A reference station configured to deliver packets in a packet switching network having a non-constant transmission time to communication devices connected to the network, said reference station comprising:
    means for retrieving image ticks from a sync signal received by said reference station;
    means for initializing an image counter from said image ticks;
    means for initializing a counter at each $m^{th}$ reset of the image counter, the counter being cadenced by a clock produced by the image counter, m being a positive, non-zero integer;
    means for sampling the counter at each $T_{ech}$ period, $T_{ech}$ being issued by a time base synchronized on all stations of the network,
    means for delivering packets comprising samples of the counter; and,
    means for inserting at least a temporal offset in said packets, wherein said temporal offset describes a data delivery duration on a pre-determined path of said network in order to address the non-constant transmission time of said packets.

2. Reference station according to claim 1, wherein every delivered packet contain temporal offset.

3. A receiving communication device connected over a packet switching network having a non-constant transmission time, said receiving communication device being able to receive packets from a reference station connected to the network, said receiving communication device being able to receive data stream from Content Delivery device being connected to the network, said receiving communication device comprising: means for receiving packets comprising samples, said samples resulting from a sampling operation realized at a Tech period ° Tech being issued by a time base synchronized on all stations of the network; means for generating a counter ramp with a Phase Locked Loop receiving the samples and delivering a synthesized clock and local samples at each Tech period; means for initializing an image counter cadenced by the synthesized clock each time the counter ramp is equal to zero; means for generating image ticks each time the image counter is equal to zero; means for generating a sync signal from the said image ticks; means for receiving at least a temporal offset value inserted in said packets in order to address the non-constant transmission time of said packets; means for receiving data stream from sending communication device; means for determining from received data stream which temporal offset it has to consider among received temporal offsets; and means for shifting temporally the received data stream with considered temporal offset.

4. Receiving communication device according to claim 3, further comprising means for shifting temporally the generated sync signal with considered temporal offset.

5. A sending communication device connected over a packet switching network having a non-constant transmission time, said sending communication device being able to receive packets from a reference station connected to the network, said sending communication device being able to send data stream over the network, said sending device comprising: means for receiving packets comprising samples, said samples resulting from a sampling operation realized at a Tech period, Tech being issued by a time base synchronized on all stations of the network; means for generating a counter ramp with a Phase Locked Loop receiving the sample and delivering a synthesized clock and local samples at each Tech period; means for initializing an image counter cadenced by the synthesized clock each time the counter ramp is equal to zero; means for generating image ticks each time the image counter is equal to zero; means for generating a sync signal from said image ticks; means for sending data stream over the network synchronously to the sync signal; and means for inserting an identification of said sending communication device in said data stream in order to address the non-constant transmission time of said data stream.

6. The reference station according to claim 1, wherein the sync signal comprises a Genlock signal.

7. The reference station according to claim 1, wherein the non-constant transmission time comprises jitter introduced by transportation over the network.

8. The reference station according to claim 7, wherein the network comprises an IP network.

9. A method of delivering packets in a packet switching network having a non-constant transmission time to communication devices connected to the network, said reference station comprising:
    retrieving image ticks from a sync signal received by said reference station;
    initializing an image counter from said image ticks;
    initializing a counter at each $m^{th}$ reset of the image counter, the counter being cadenced by a clock produced by the image counter, m being a positive, non-zero integer;
    sampling the counter at each $T_{ech}$ period, $T_{ech}$ being issued by a time base synchronized on all stations of the network,
    delivering packets comprising samples of the counter; and inserting at least a temporal offset in said packets, wherein said temporal offset describes a data delivery duration on a pre-determined path of said network in order to address the non-constant transmission time of said packets.

10. The method according to claim 9, wherein every delivered packet contains temporal offset.

11. The reference station according to claim 9, wherein the sync signal comprises a Genlock signal.

12. The reference station according to claim 9, wherein the non-constant transmission time comprises jitter introduced by transportation over the network, and wherein the network comprises an IP network.

13. A method of receiving communication over a packet switching network having a non-constant transmission time, said method comprising:
   receiving packets comprising samples, said samples resulting from a sampling operation realized at a $T_{ech}$ period $T_{ech}$ being issued by a time base synchronized on all stations of the network;
   generating a counter ramp with a Phase Locked Loop receiving the samples and delivering a synthesized clock and local samples at each $T_{ech}$ period;
   initializing an image counter cadenced by the synthesized clock each time the counter ramp is equal to zero;
   generating image ticks each time the image counter is equal to zero;
   generating a sync signal from the said image ticks;
   receiving at least a temporal offset value inserted in said packets in order to address the non-constant transmission time of said packets;
   receiving data stream from sending communication device connected to the network;
   determining from received data stream which temporal offset it has to consider among received temporal offsets; and
   shifting temporally the received data stream with considered temporal offset.

14. The method according to claim 12, further comprising: shifting temporally the generated sync signal with considered temporal offset.

15. The method according to claim 12, wherein the sync signal comprises a Genlock signal.

16. The method according to claim 12, wherein the non-constant transmission time comprises jitter introduced by transportation over the network, and wherein the network comprises an IP network.

17. The method according to claim 12, further comprising:
   receiving regularly a plurality of temporal offset values each being associated with a Genlock plane; and
   receiving an identification of the Genlock plane from which the data is sent in parallel with the data stream; and
   determining a temporal offset to consider among the plurality of temporal offset values received based on the identification of the Genlock plane.

18. A method of sending communication over a packet switching network having a non-constant transmission time, after receiving packets from a reference station connected to the network, said method comprising:
   receiving packets comprising samples, said samples resulting from a sampling operation realized at a $T_{ech}$ period, $T_{ech}$ being issued by a time base synchronized on all stations of the network;
   generating a counter ramp with a Phase Locked Loop receiving the samples and delivering a synthesized clock and local samples at each $T_{ech}$ period;
   initializing an image counter cadenced by the synthesized clock each time the counter ramp is equal to zero;
   generating image ticks each time the image counter is equal to zero;
   generating a sync signal from said image ticks;
   sending data stream over the network synchronously to the sync signal; and
   inserting an identification of said sending communication device in said data stream in order to address the non-constant transmission time of said packets.

19. The method according to claim 17, wherein the sync signal comprises a Genlock signal.

20. The method according to claim 17, wherein the non-constant transmission time comprises jitter introduced by transportation over the network, and wherein the network comprises an IP network.

21. The method according to claim 17, wherein the identification of the sending communication device enables a receiving device to select a temporal offset among a plurality of received temporal offset values.

* * * * *